United States Patent
Kuwakino

(10) Patent No.: US 7,460,778 B2
(45) Date of Patent: Dec. 2, 2008

(54) TAKING LENS

(75) Inventor: Koshi Kuwakino, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 358 days.

(21) Appl. No.: 11/290,556

(22) Filed: Dec. 1, 2005

(65) Prior Publication Data

US 2006/0140611 A1 Jun. 29, 2006

(30) Foreign Application Priority Data

Dec. 3, 2004 (JP) ............ P. 2004-351177

(51) Int. Cl.
*G03B 13/22* (2006.01)
*G03B 3/00* (2006.01)
(52) U.S. Cl. .................... 396/91; 396/121; 348/345
(58) Field of Classification Search .............. 396/91, 396/80, 83, 104, 111, 119, 121; 348/33, 348/164, 345, 357, 342; 250/201.2–201.8, 250/216, 208.1; 359/637
See application file for complete search history.

(56) References Cited

U.S. PATENT DOCUMENTS 5,982,423 A * 11/1999 Sekiguchi ............. 348/216.1

FOREIGN PATENT DOCUMENTS

| EP | 1 487 199 A1 | 12/2004 |
|---|---|---|
| JP | 2000-078456 A | 3/2000 |
| JP | 2002-098876 A | 4/2002 |
| JP | 2003-262775 A | 9/2003 |

* cited by examiner

*Primary Examiner*—Jay M Patidar
(74) *Attorney, Agent, or Firm*—Birch, Stewart, Kolasch & Birch, LLP

(57) ABSTRACT

A taking lens capable of being used for photographing by light in each of at least two wavelength regions including a first wavelength region and a second wavelength region is provided and include: the flange back adjusting lens; a storing unit that stores a correcting amount of the flange back adjusting lens in photographing by light in the second wavelength region; and the lens driving unit. When the taking lens is used in photographing by light in the first wavelength region, the lens driving unit moves the flange back adjusting lens to a set position adjusted at the flange back; and when the taking lens is used in photographing by light in the second wavelength region, the lens driving unit moves the flange back adjusting lens based on the correcting amount so that an image location in photographing by light in the second wavelength region coincides with an image location in photographing by light in the first wavelength region.

15 Claims, 3 Drawing Sheets

FIG. 2

| DISTANCE / MAGNIFI-CATION | 2.2m | 2.4m | 2.8m | 3.1m | 3.7m | 4.4m | 5.5m | 7.3m | 11.0m | 22.0m | ∞ (INF) |
|---|---|---|---|---|---|---|---|---|---|---|---|
| 1.0X | -0.693 | -0.693 | -0.693 | -0.693 | -0.692 | -0.692 | -0.692 | -0.691 | -0.691 | -0.691 | -0.691 |
| 2.0X | -0.813 | -0.813 | -0.811 | -0.810 | -0.809 | -0.808 | -0.807 | -0.806 | -0.805 | -0.804 | -0.803 |
| 4.0X | -0.934 | -0.931 | -0.925 | -0.922 | -0.917 | -0.913 | -0.909 | -0.904 | -0.900 | -0.896 | -0.891 |
| 6.0X | -1.033 | -1.025 | -1.013 | -1.006 | -0.995 | -0.986 | -0.976 | -0.966 | -0.956 | -0.946 | -0.936 |
| 9.0X | -1.215 | -1.197 | -1.169 | -1.153 | -1.128 | -1.107 | -1.086 | -1.064 | -1.042 | -1.020 | -0.998 |
| 12.0X | -1.458 | -1.427 | -1.379 | -1.350 | -1.306 | -1.270 | -1.232 | -1.194 | -1.155 | -1.117 | -1.079 |
| 15.0X | -1.744 | -1.703 | -1.636 | -1.595 | -1.531 | -1.476 | -1.418 | -1.360 | -1.300 | -1.242 | -1.183 |
| 18.0X | -2.036 | -1.996 | -1.925 | -1.877 | -1.797 | -1.724 | -1.644 | -1.562 | -1.477 | -1.393 | -1.309 |
| 20.0X | -2.293 | -2.208 | -2.120 | -2.070 | -1.986 | -1.907 | -1.815 | -1.717 | -1.613 | -1.509 | -1.406 |
| 22.0X | -2.632 | -2.515 | -2.370 | -2.302 | -2.193 | -2.096 | -1.987 | -1.873 | -1.752 | -1.629 | -1.506 |
| 24.0X | -3.010 | -2.901 | -2.681 | -2.585 | -2.442 | -2.314 | -2.169 | -2.021 | -1.866 | -1.713 | -1.561 |

TAKING LENS

FIELD OF THE INVENTION

The present invention relates to a taking lens, particularly to a taking lens capable of photographing (or shooting) by light in a plurality of wavelength regions.

BACKGROUND OF THE INVENTION

There is a television camera constituted by a television camera body and a taking lens, which can be used both in a visible light region and in a near infrared region. In a case where the taking lens in such a television camera is set to focus in the visible light region, when photographing is carried out in the near infrared region, there poses a problem that an imaging face (hereinafter, referred to as image location) of a image-capturing element (CCD) of the television camera body is shifted by an on axis chromatic aberration caused by a difference in the wavelength region.

With regard to such a problem, a lens system (taking lens) disclosed in JP-A-2003-262775 resolves the shift of the image location by the on-axis chromatic aberration by correcting a position of setting a flange back adjusting lens (tracking lens) inherently provided for adjusting a flange back in photographing by light in the near infrared region.

Meanwhile, as a television camera body on which a taking lens is mounted, there is a television camera arranging an IR cut filter on a front side of an optical axis of a photographing element in photographing by light in the visible region and removing the IR cut filter from the optical axis in photographing by light in the near infrared region. In this case, there is present a television camera in which in consideration of the shift of the image location between photographing by light in the visible region and in photographing by light in the near infrared region, an optical length is changed by changing a thickness of the IR cut filter and a thickness of clear glass to thereby cancel the shift of the image location.

JP-A-2003-262775 does not take a television camera body producing the change in the optical length as described above into consideration. Therefore, when the taking lens for correcting the shift of the image location only by the taking lens as in JP-A-2003-262775 is attached to the television camera body for correcting the shift of the image location between photographing by light in the visible light region and in photographing by light in the near infrared region only by the television camera body, the shift of the image location is doubly corrected by the television camera body and the taking lens to pose a problem that the shift of the image location cannot be resolve as a total of the television camera.

SUMMARY OF THE INVENTION

Hence, the invention has been carried out in view of such a situation, and an object of an illustrative, non-limiting embodiment of the invention is to provide a taking lens capable of resolving a shift of an image location even when a television camera body bringing about a change in an optical length is used. Also, the invention is not required to solve the above-described problems, and an illustrative, non-limiting embodiment of the invention may solve a different problem or may not solve any problems.

According to an illustrative, non-limiting embodiment of the invention, there is provided a taking lens capable of being used for photographing by light in each of at least two wavelength regions including a first wavelength region and a second wavelength region, the taking lens including: a focus lens for adjusting a focus (i.e., a first lens); a flange back adjusting lens for adjusting a flange back (i.e., a second lens); a flange back adjusting lens-driving unit for moving a position of the flange back adjusting lens in a direction along an optical axis of the taking lens; a correcting amount-storing unit for storing a correcting amount of the flange back adjusting lens in photographing by light in the second wavelength region, the correcting amount being determined on the basis of: a change amount of an optical length of the taking lens in photographing by light in the second wavelength region relative to an optical length of the taking lens in photographing by light in the first wavelength region; and a change amount of an optical length a television camera body, on which the taking lens is mounted, in photographing by light in the second wavelength region relative to an optical length of the television camera body in photographing by light in the first wavelength region; and a flange back adjusting lens-controlling unit for controlling the flange back adjusting lens-driving unit, wherein when the taking lens is used in photographing by light in the first wavelength region, the flange back adjusting lens-driving unit moves the flange back adjusting lens to a set position adjusted at the flange back; and when the taking lens is used in photographing by light in the second wavelength region, the flange back adjusting lens-driving unit moves the flange back adjusting lens based on the correcting amount read from the correcting amount-storing unit so that an image location in photographing by light in the second wavelength region coincides with an image location in photographing by light in the first wavelength region According to the embodiment, the correcting amount of the flange back adjusting lens is determined based not only on the change amount of the optical length of the taking lens but also on the change amount of the optical length of the television camera body. Further, in photographing by light in the second wavelength region, the flange back adjusting lens is corrected to a position moved by the correcting amount from the set position adjusted at flange back and the image locations in photographing by light in the first wavelength region and in photographing by light in the second wavelength region coincide with each other. Therefore, even when the television camera body bringing about a change in the optical length is used, the shift of the image location is resolved.

In another embodiment, the taking lens may further includes an operating unit capable of moving the flange back adjusting lens in the direction along the optical axis, wherein an amount of operating the operating unit corresponds to the change amount of the optical length of the television camera body.

According to the embodiment, in photographing by light in the second wavelength region, by operating the operating unit while confirming a taken image, the change amount of the optical length of the television camera body can be set. Particularly, according to the embodiment, even when the change amount of the optical length of the television camera body is not known, the change amount of the optical length can indirectly be set by operating the operating unit.

In another embodiment of the taking lens, the first wavelength is a wavelength region of visible light and the second wavelength region is a wavelength region of near infrared ray.

The embodiment is limited to that the first wavelength region is constituted by the visible light region and the second wavelength region is constituted by the near infrared region.

According to an exemplary embodiment of the invention, the correcting amount of the flange back adjusting lens is determined based not only on the change amount of the optical length of the taking lens but also on the change amount of the optical length of the television camera body. Further, in photographing by light in the second wavelength region, the flange back adjusting lens is corrected to the position moved by the corrected amount from the set position adjusted at the flange back, and the image locations in photographing by light in the first wavelength region and in photographing by light in the second wavelength region coincide with each other. Therefore, even when the television camera body bringing about a change in the wavelength region is used, the shift of the image location is resolved.

BRIEF DESCRIPTION OF THE DRAWINGS

FIG. 2 is a diagram indicating an exemplary first correction data by a data table.

DETAILED DESCRIPTION OF THE INVENTION

A detailed explanation will be given an exemplary embodiment of a taking lens according to the invention in reference to the attached drawings as follows.

Figure 1:
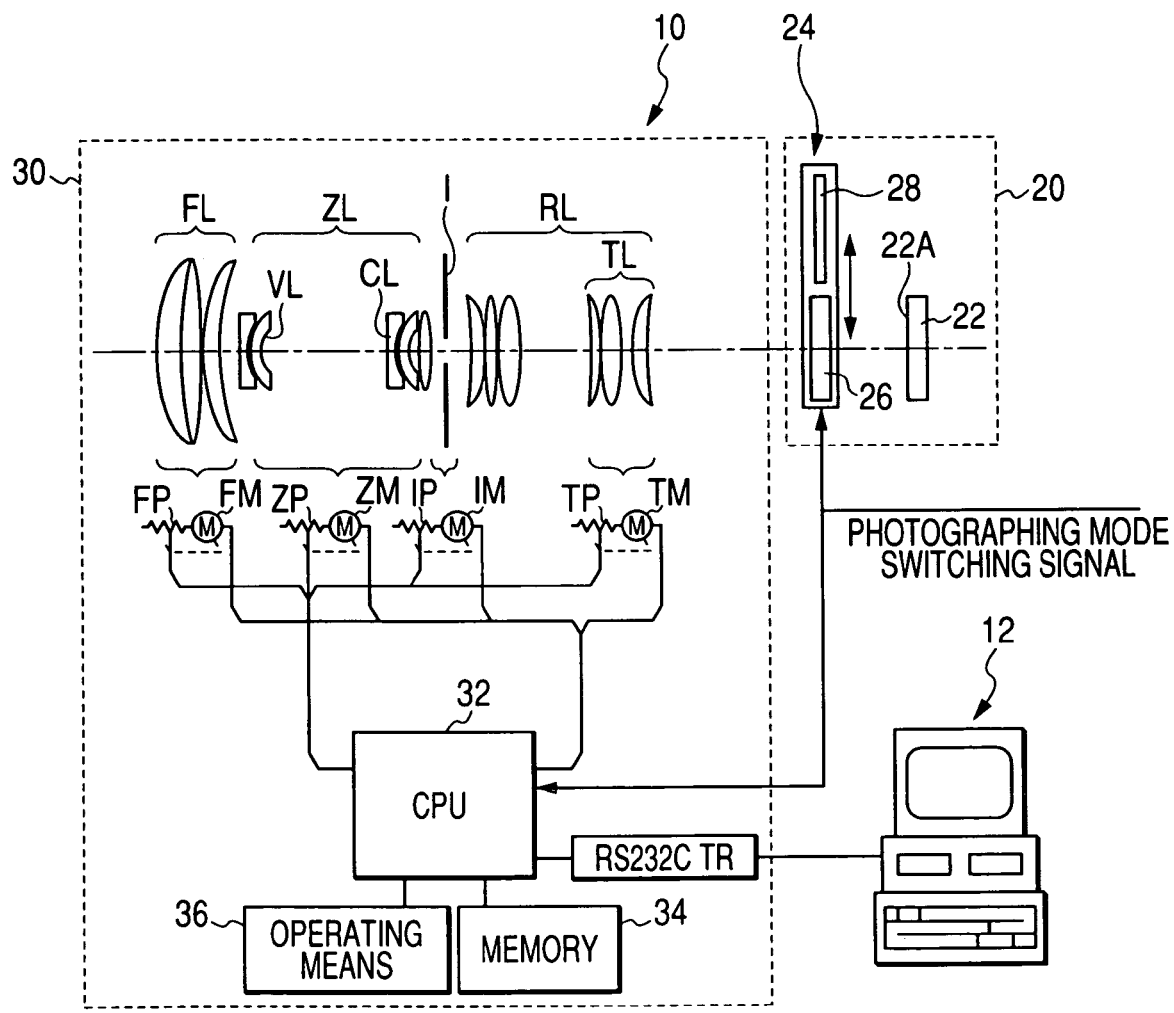
FIG. 1 is a view showing a total constitution of a television camera according to an illustrative, non-limiting embodiment of the invention.

FIG. 1 is a total constitution view of an exemplary embodiment of a television camera having a taking lens to which the invention is applied. As shown by the drawing, a television camera 10 includes a television camera body 20 and a taking lens 30 mounted on the television camera body 20.

The television camera body 20 is provided with an image-capturing element (CCD) 22 and an infrared ray cut filter mechanism 24 arranged on a front side (object side) of the image-capturing element 22 along an optical axis. The infrared ray cut filter mechanism 24 is constituted to arrange either one of an infrared ray cut filter 26 and clear glass 28 on the optical axis in accordance with a photographing mode.

Here, in the photographing mode, there are a standard photographing mode for photographing by light in a visible region (hereinafter referred to as standard photographing mode) and a photographing mode when photographing is carried out by light of an infrared region (hereinafter, referred to as near infrared photographing mode). The photographing modes of the television camera body 20 and the taking lens 30, mentioned later, are constituted to be switched alternately in accordance with a photographing mode switching signal transmitted from, for example, an optical sensor, not illustrated, provided at outside of the television camera 10.

When the television camera body 20 is in the standard mode, the near infrared ray cut filter 26 is arranged on the optical axis. On the other hand, when the television camera body 20 is in the near infrared ray photographing mode, the clear class 28 is arranged thereon. The infrared ray cut filter 26 and the clear glass 28 are switched by driving a motor, not illustrated, in accordance with reception of the photographing mode switching signal.

The television camera body 20 according to the embodiment is constituted to bring about a change in an optical length between the standard photographing mode and the near infrared ray photographing mode. That is, a thickness of the clear glass 28 arranged on the optical axis in the case of the near infrared ray photographing mode is constituted to be thinner than that of the infrared ray cut filter 26 arranged on the optical axis in the case of the standard photographing mode. Further, refractive indices of the clear glass 28 and the infrared ray cut filter 26 are constituted to be substantially equal. Therefore, an image location in the case of arranging the clear glass 28 on the optical axis becomes a position of being shifted to an object side (front side of optical axis) in comparison with an image location in the case of arranging the infrared ray cut filter 26. The thickness of the clear glass 28 in the television camera body 20 is frequently designed in prospect of an amount of a change in an optical length caused by an on axis chromatic aberration of the taking lens. Therefore, when a taking lens having an amount of a change in an optical length of the taking lens different from that prospect in design is mounted on the television camera body 20, there poses a problem that a shift in an image location is not resolved.

The taking lens 30 according to the embodiment can resolve the shift of the image location even when the taking lens 30 is mounted on the television camera 20 constituted to bring about the change in the optical length between the standard photographing mode and the near infrared ray photographing mode as described above. In the following, a constitution of the taking lens 30 will be explained.

The taking lens 30 is arranged with a focus lens (group) FL, a zoom lens (group) ZL, an iris I, and a relay lens (group) RL successively from an object side, and object light from an object disposed at an object distance successively passes through the focus lens FL, the zoom lens ZL, the iris I and the relay lens RL and focused on a light receiving face (image-capturing face) 22A of the image-capturing element (CCD) 22 of the television camera body 20 arranged on a rear side of the relay lens RL.

Here, the focus lens FL is a lens for adjusting a focus and is arranged movably in a direction along the optical axis. When a position of setting the focus lens FL is changed by moving the focus lens FL, the image location is changed and the object distance of the focused object is changed.

The zoom lens ZL is a lens for adjusting a zoom magnification and is constituted by a magnification changing system lens VL and a correcting system lens CL. The magnification changing system lens VL and the correcting system lens CL are movably arranged in the optical axis direction with a constant positional relationship therebetween, and when the magnification changing system lens VL and the correcting system lens CL are moved to change respective set positions, whereas the focal length is changed by the magnification changing system lens VL, a variation in an image point is prevented by the correcting system lens CL and only the zoom magnification is changed. Further, the set positions of the magnification changing system lens VL and the correcting system lens CL are indicated by a single position parameter as a set position of the zoom lens ZL.

A tracking lens TL constituting a portion of the relay lens RL is arranged movably in the optical axis direction as a lens for adjusting a flange back (i.e., a flange back adjusting lens). The flange back can be adjusted for adjusting the set position of the tracking lens TL. Further, when the photographing mode is set to the near infrared ray photographing mode as mentioned later, the set position of the tracking lens TL is automatically corrected to a pertinent position.

Further, the taking lens 30 includes: motors FM, ZM, IM, TM connected to be able to transmit power to respectives of the focus lens FL, the zoom lens ZL, the iris I, and the tracking lens TL; potentiometers FP, ZP, IP and TP for detecting positions of the focus lens FL, the zoom lens ZL, the iris I, and the tracking lens TL, respectively; CPU 32; a memory 34; and operating means 39.

The respective motors (lens driving units) FM, ZM, IM, and TM are constituted to be driven by a drive signal outputted from CPU 32. Further, detecting signals outputted from the respective potentiometers FP, ZP, IP, and TP are inputted to CPU 32. Therefore, by outputting the drive signal by CPU 32 to the respective motors FM, ZM, IM, and TM while detecting current positions of the respective focus lens FL, the zoom lens ZL, the iris I, and the tracking lens TL by the detecting signals of the respective potentiometers FP, ZP, IP, and TP, the focus lens FL, the zoom lens ZL, the iris I, and the tracking lens TL are driven by the motors and controlled to constitute desired set positions or moving speeds.

Further, CPU 32 is inputted with a photographing mode switching signal. CPU 32 is operated to switch the photographing mode when a photographing mode switching signal is received. There are the standard photographing mode and the near infrared ray photographing mode in the photographing mode of the taking lens 30. In the case of the standard photographing mode, the tracking lens TL is set to a set position of adjusting the flange back (hereinafter, referred to as flange back adjusting position). On the other hand, in the case of the near infrared ray photographing mode, the tracking lens TL is set to a corrected position calculated based on correction data (i.e., an correcting amount of the tracking lens TL), mentioned later. Therefore, CPU 32 outputs the drive signal to the motor TM to move the tracking lens TL to a desired position in accordance with the photographing mode when the photographing mode switching signal is received.

The correction data for calculating the corrected position of the tracking lens TL in the near infrared ray photographing mode is constituted by correction data (hereinafter, referred to as first correction data) in correspondence with an amount of a change in an optical length by an on-axis chromatic aberration of the taking lens 30 and correction data (hereinafter, second correction data) in correspondence with an amount of a change in an optical length of the television camera body 20.

The first correction data is formed beforehand and stored in the memory 34 (ROM, EEPROM or the like) of the taking lens 30, which is readable by CPU 32. Further, the first correction date may be acquired beforehand from a personal computer 12 (from a record medium of a hard disk, a floppy disk or the like of the personal computer 12) to be written to the memory 34 in the taking lens 30, or when the photographing mode is switched, only the first correction data used in the photographing mode may be acquired from the personal computer 12 to be written to the memory 34 in the taking lens 30. Further, at each time of correcting the tracking lens TL, only a corrected amount necessary for the correction of the first correction data may be acquired from the personal computer 12.

Figure 3:
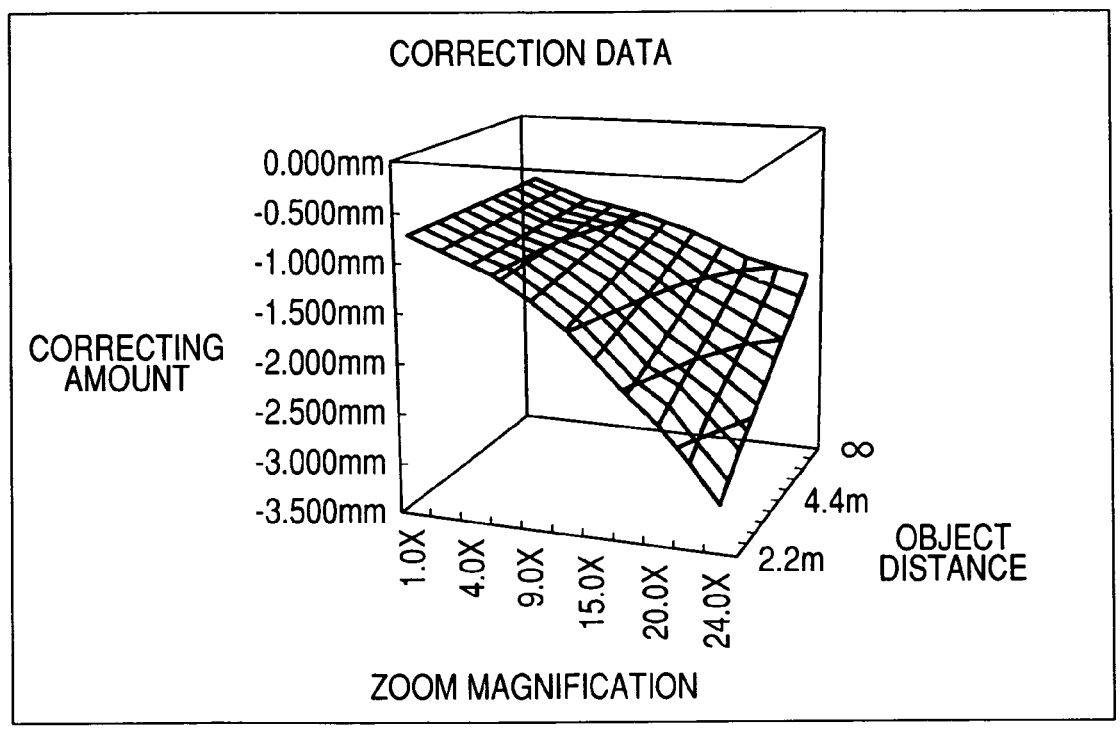
FIG. 3 is a diagram showing the first correction data of FIG. 2 by graph display.

The first correction data is indicated by a date table as shown by, for example, FIG. 2. A row index of the data table of FIG. 2 shows a value of the object distance in correspondence with the set position of the focus lens FL, and a column index shows a value of the zoom magnification in correspondence with the set position of the zoom lens ZL. Respective columns in the table show correcting amounts of the tracking lens TL at the respective object distances (positions of setting the focus lens FL) and the zoom magnifications (set positions of the zoom lens ZL). The correcting amount of the tracking lens TL indicates a displacement amount by constituting a reference by the flange back adjusting position of the tracking lens TL in the standard photographing mode. In the case of a positive value, the correcting amount signifies to displace the tracking lens TL to a rear side (focal side) of the optical axis, and in the case of a negative value, the correcting amount signifies to displace the tracking lens TL to a front side (object side) of the optical axis. Further, FIG. 3 shows a data table of FIG. 2 by graph display.

On the other hand, the second correction data is data for correcting a change in an optical length caused by a difference between thicknesses of the infrared ray cut filter 26 arranged on the optical axis in the standard photographing mode and the clear glass 28 arranged on the optical axis in the near infrared ray photographing mode. The second correction data is calculated from the thicknesses of the infrared ray cut filter 26 and the clear glass 28 and the refractive indices. For example, when the thickness of the infrared ray cut filter 26 is set to 2.0 mm, the thickness of the clear glass 28 is set to 1.5 mm, and the refractive indices of the infrared ray cut filter 26 and the clear glass 28 are set to 1.7, and a refractive index of air is set to 1.0, a change amount $\Delta t$ of an optical length in correspondence with the second correction data is shown by the following equation.

$$\Delta t = (2.0-1.5) \times (1.7-1.0) = 0.35 \text{ mm} \quad (1)$$

The second correction data calculated in this way indicates a displacement amount in the case of constituting a reference by a corrected position of the tracking lens TL corrected by the first correction data. In the case of a positive value, the second correction data signifies to displace the tracking lens TL to the rear side (focal side) of the optical axis, and in the case of a negative value, the second correction data signifies to displace the tracking lens TL to the front side (object side) of the optical axis.

The second correction data is determined in accordance with the television camera body 20 used. When the second correction data can be calculated as described above, the second correction data may be stored in the memory 34 beforehand. A storing method thereof is similar to that of the above-described first correction data and therefore, an explanation thereof will be omitted.

Further, the taking lens 30 is provided with the operating means 36 for setting the second correction data. The operating means 36 is constituted by, for example, a volume and by operating to pivot the volume, the tracking lens TL can be moved in the optical axis direction. Further, an amount of operating the operating means 36 is corresponds to a change amount of the optical length of the television camera body 20. Therefore, in the near infrared ray photographing mode, by operating the operating means 36 while confirming a taken image, the second correction data in correspondence with the change amount of the optical length of the television camera body 20 can be set. The method of indirectly setting the second correction data in this way is effective particularly when the change amount of the optical length of the television camera body 20 cannot be calculated as described above. Further, the amount of operating the operating means in correspondence with the second correction data may be stored in the memory 34 and read from CPU 32, or CPU 32 may be constituted to directly read the amount of operating the operating mean 36.

Operation of the preferable embodiment of the invention constituted as described above is as follows. When the television camera body 20 and the taking lens 30 receive the photographing mode switching signal and the standard photographing mode is selected, a motor, not illustrated, is driven and the infrared ray cut filter 26 is arranged on the front side of the optical axis of the image-capturing element 22 of the television camera body 20. Further, the drive signal is outputted from CPU 32 of the taking lens 30 to the motor TM and the tracking lens TL is set to the flange back adjusting position. Further, the focus lens FL and the zoom lens ZL are set to desired positions based on an instruction from a controller, not illustrated, and the television camera 10 is brought into a focused state.

In contrast thereto, when the television camera body 20 and the taking lens 30 receive the photographing mode switching signal and the infrared ray photographing mode is selected, a motor, not illustrated, is driven and the clear glass 28 is arranged on the front side of the optical axis of the image-capturing element 22 of the television camera body 20. Further, CPU 32 of the taking lens 30 detects current positions of the focus lens FL and the zoom lens ZL from the potentiometers FP, ZP, reads the first correction data in correspondence with the current positions from the memory 34 and reads the second correction data from the memory 34 (or operating means 36). Further, CPU 32 calculates a correcting amount by adding the change amount of the optical length of the taking lens 30 in correspondence with the first correction data to the change amount of the optical length on the side of the television main body 20 in correspondence with the second correction data. Further, CPU 32 calculates the corrected position of the tracking lens TL by adding the correcting amount to the flange back adjusting position of the tracking lens TL. Further, CPU 32 outputs the dirive signal to the motor TM so that the motor TM moves the tracking lens TL to the corrected position. Thereby, the image location in the near infrared ray photographing mode coincides with the image location in the standard photographing mode.

According to the embodiment, the corrected amount of the tracking lens TL is calculated base not only on the change amount of the optical length of the taking lens 30 but also on the change amount of the optical length of television camera body 20. Further, in the near infrared ray photographing mode, the tracking lens TL is corrected to a position by moving by an amount of the above-described correcting amount from the flange back adjusting position of the tracking lens TL, and the image location in the normal photographing mode and the image location in the near infrared ray photographing mode coincide with each other. Therefore, the shift of the image location is resolved even when the television camera body 20 bringing about the change in the optical length is used.

Although according to the embodiment, the photographing modes includes the standard photographing mode of photographing by light in the visible light region and the near infrared ray photographing mode of photographing by light in the near infrared ray region, the invention is not limited thereto but is applicable to a photographing mode for photographing by light in other wavelength region. Further, the photographing modes are not limited to two but may be three or more. In this case, the correction data may be formed for respective photographing modes. Further, the standard photographing mode may be a case of photographing by light in other wavelength region.

Further, although according to the embodiment, the second correction data in correspondence with the television camera body 20 used is set, the invention is not limited thereto but may be constituted such that a plurality of the second correction data are formed beforehand to be stored in the memory 32 and a user can pertinently select therefrom.

Further, although according to the embodiment, the photographing mode of the taking lens 30 is switched in accordance with the photographing mode switching signal inputted from outside of the television camera 10, the invention is not limited thereto but may be constituted to receive the photographing mode switching signal from the television camera body 20. Further, the invention may be constituted such that a selecting switch is provided to the taking lens 30 and the photographing mode can be switched manually.

Although the detailed explanation has been given of the taking lens of the invention as described above, the invention is not limited to the above example but can naturally be improved or modified variously within the range not deviated from the spirit or scope of the invention.

The present application claims foreign priority based on Japanese Patent Application No. JP2004-351177, filed Dec. 3 of 2004, the contents of which is incorporated herein by reference.

What is claimed is:

1. A taking lens capable of being used for photographing by light in each of at least two wavelength regions, the at least two wavelength regions including a first wavelength region and a second wavelength region, the taking lens comprising:
   a first lens that adjusts a focus of the taking lens;
   a second lens that adjusts a flange back of the taking lens;
   a lens driving unit that moves a position of the second lens in a direction along an optical axis of the taking lens;
   a storing unit that stores a correcting amount of the second lens in photographing by light in the second wavelength region, the correcting amount being determined on the basis of: a change amount of an optical length of the taking lens in photographing by light in the second wavelength region relative to an optical length of the taking lens in photographing by light in the first wavelength region; and a change amount of an optical length of a television camera body, on which the taking lens is mounted, in photographing by light in the second wavelength region relative to an optical length of the television camera body in photographing by light in the first wavelength region; and
   a lens controlling unit that controls the lens driving unit, wherein when the taking lens is used in photographing by light in the first wavelength region, the lens driving unit moves the second lens to a set position adjusted at the flange back; and when the taking lens is used in photographing by light in the second wavelength region, the lens driving unit moves the second lens based on the correcting amount read from the storing unit so that an image location in photographing by light in the second wavelength region coincides with an image location in photographing by light in the first wavelength region.

2. The taking lens according to claim 1, which further comprises an operating unit that moves the second lens in the direction along the optical axis, wherein an amount of operating the operating unit corresponds to the change amount of the optical length of the television camera body.

3. The taking lens according to claim 2, wherein said operating unit is operated while confirming a taken image and a correcting amount of the second lens determined on the basis of said change amount of an optical length of said television camera body is set.

4. The taking lens according to claim 1, wherein the first wavelength is a wavelength region of visible light, and the second wavelength region is a wavelength region of near infrared ray.

5. The taking lens according to claim 1, further comprising a zoom lens for adjusting a zoom magnification, said zoom lens including a magnification changing system lens and a correcting system lens.

6. The taking lens according to claim 1, further comprising a switching unit for switching a photographing mode when a photographing mode switching signal is received.

7. The taking lens according to claim 1, wherein said change amount of an optical length of the taking lens is an amount of a change in an optical length by an on-axis chromatic aberration of the taking lens.

8. The taking lens according to claim 1, wherein a correcting amount of the second lens determined on the basis of said change amount of an optical length of the taking lens is pre-determined and stored in said storing unit.

9. The taking lens according to claim 1, wherein a correcting amount of the second lens determined on the basis of said change amount of an optical length of the taking lens is indicated by a data table.

10. The taking lens according to claim 1, wherein a correcting amount of the second lens determined on the basis of said change amount of an optical length of said television camera body is data for correcting a change in an optical length caused by a difference between thicknesses of a ray cut filter ranged on the optical axis when photographing by light in the first wavelength region, and of a clear glass arranged on the optical axis when photographing by light in the second wavelength region.

11. The taking lens according to claim 1, wherein a correcting amount of the second lens determined on the basis of said change amount of an optical length of said television camera body is pre-determined and stored in said storing unit.

12. The taking lens according to claim 1, wherein said correcting amount of the second lens is determined by adding said change amount of an optical length of the taking lens and said change amount of an optical length of said television camera body.

13. The taking lens according to claim 1, wherein correcting amounts of the second lens are calculated for photographing by light in at least three wavelength regions.

14. The taking lens according to claim 1, wherein a plurality of correcting amounts are determined on the basis of change amounts of an optical length of said television camera body.

15. A method for photographing by light in each of at least two wavelength regions using a taking lens, the at least two wavelength regions including a first wavelength region and a second wavelength region, the method comprising:
adjusting a focus of the taking lens;
when photographing by light in the first wavelength region, moving a second lens to a set position adjusted at a flange back adjusting position; and
when photographing by light in the second wavelength region, moving The second lens based on a correcting amount so that an image location in photographing by light in the second wavelength region coincides with an image location in photographing by light in the first wavelength region,
wherein said correcting amount is determined on the basis of: a change amount of an optical length of the taking lens in photographing by light in the second wavelength region relative to an optical length of the taking lens in photographing by light in the first wavelength region; and a change amount of an optical length of a television camera body, on which the taking lens is mounted, in photographing by light in the second wavelength region relative to an optical length of the television camera body in photographing by light in the first wavelength region.

* * * * *